United States Patent [19]

Kinoshita et al.

[11] Patent Number: 5,500,814
[45] Date of Patent: Mar. 19, 1996

[54] MEMORY SYSTEM AND CACHE MEMORY SYSTEM

[75] Inventors: Itsuko Kinoshita; Akitoshi Osaki, both of Itami, Japan

[73] Assignee: Mitsubishi Denki Kabushiki Kaisha, Tokyo, Japan

[21] Appl. No.: 286,119

[22] Filed: Aug. 4, 1994

[30] Foreign Application Priority Data

Aug. 5, 1993 [JP] Japan .................................. 5-194764

[51] Int. Cl.⁶ .......................... G11C 11/413; G11C 15/04
[52] U.S. Cl. ................ 365/49; 365/189.07; 365/189.08; 365/189.05; 365/230.03; 365/230.06; 365/231
[58] Field of Search .................. 365/189.05, 49, 365/189.07, 189.08, 230.03, 230.06, 231; 371/12

[56] References Cited

U.S. PATENT DOCUMENTS 4,641,305  2/1987  Joyce et al. ............................. 371/12

FOREIGN PATENT DOCUMENTS 62-210547  9/1987  Japan .
3-147038  6/1991  Japan .

*Primary Examiner*—Viet Q. Nguyen
*Attorney, Agent, or Firm*—Lowe, Price, LeBlanc & Becker

[57] ABSTRACT

A memory system, wherein the respective byte memories 1 to 4 is configured so that data of word unit which are the targets of the parity calculation done by the parity calculation circuits 5 to 8 occupy respectively the same bit positions as those of the 4-word data of word unit, is provided with multiplexers 41 to 44 for connecting selectively to the data bus 29 the bit positions of the data of word unit selected by the word select control circuit 23 in such byte memories 1 to 4. The memory system is capable of improving the flexibility of the memory configuration by being eased of the limitation of the arrangement of bits which are the targets of parity calculation, and reducing the occupied areas of the write/read circuit on a chip as well as the electric power consumption.

1 Claim, 10 Drawing Sheets

MEMORY SYSTEM AND CACHE MEMORY SYSTEM

BACKGROUND OF THE INVENTION

1. Field of the Invention

This invention relates to a memory system including parity bits, more particularly, to a memory system and cache memory system, from which multi-bit data is read out successively, in which the parity configuration is improved.

2. Description of Related Art

In recent years, in accompany with the use of multi-bit data in a microprocessor or the like, it becomes necessary, in a memory system, to compose data with multiple bits. In case of processing multi-bit data, it is natural that data reliability is a point of problem. Therefore, such a method as to detect errors at the time of data transfer by the use of parity is widely adopted.

On the other hand, in accompany with high speedization of a microprocessor or the like, it is required that the memory system can read data successively (continuous reading). In case of memory system including parity, it is necessary to perform parity calculation at higher speed.

From such circumstances as aforementioned, in a memory system capable of continuous reading and including parity bits, conventionally, such a memory configuration as shown in FIG. 2 and FIG. 3 is required in whole configuration as shown in a block diagram in FIG. 1.

In FIG. 2, a first memory block MB1 and a second memory block MB2 in the whole configuration shown in FIG. 1 are shown, and in FIG. 3, a third memory block MB3 and a fourth memory block MB4 in the whole configuration shown in FIG. 1 are shown. Each of the first to fourth memory blocks MB1 to MB4 is composed of first to fourth byte memories 1 to 4, first to fourth write/read circuits 19 to 22, first to fourth parity memories 9 to 12, and first to fourth parity calculation circuits 5 to 8.

The memory system shown in FIG. 1, FIG. 2 and FIG. 3 is capable of 4-word continuous reading. One word is one byte (8 bits), and a parity bit of one bit corresponds to one word. The parity bit is calculated and stored when data is written into a memory. At the time when data is read out from a memory, the parity of the content of the data read from the memory is calculated, and by that it is compared with a value of the parity bit corresponding to the data, so that data reliability is guaranteed. At that time, when the parities are not coincided with each other, the fact is informed to the outside.

In a block diagram shown in FIG. 1, FIG. 2 and FIG. 3, arrangement of each part of the memory system is considered.

Each of the first to fourth memories 1 to 4 is composed of 8 rows, and each of them stores each one word of the data of the first to fourth words which are the targets of 4-word continuous reading. Each of the byte memories 1 to 4 is non-destructive read out type.

To each row of each of the byte memories 1 to 4, each one-bit parity bit is so arranged as to be accessed at the same time, and each 8-bit parity bits corresponding to each byte memories 1 to 4 configures each of the first to fourth parity memories 9 to 12.

The parity calculation is performed by the first to fourth parity calculation circuits 5 to 8. Corresponding to the respective words stored in the first to fourth byte memories 1 to 4 in unit of row, and the respective results are made to be stored in the respective parity bits in the same row as the data to which the respective parity memories 9 to 12 corresponds. The first to fourth parity calculation circuits 5 to 8 calculate, at the time when data are read out from the first to fourth byte memories 1 to 4 in unit of row, parities from the contents of the data read out from the respective byte memories 1 to 4, compare these calculation results with the values of the parity bits in the same rows as the data to which the respective parity memories 9 to 12 correspond, and output first to fourth uncoincidence signals 13 to 16.

The first to fourth uncoincidence signals 13 to 16 show that the data read out from the corresponding byte memories 1 to 4 or the values of the parity bits read out from the parity memories 9 to 12 are not reliable, by that they become active when the comparison result are uncoincidence.

These first to fourth uncoincidence signals 13 to 16 are logical-summed by an OR circuit 17 so as to be outputted to the outside as an error signal 18.

The writing and reading of data to and from the first to fourth byte memories 1 to 4 are controlled by the first to fourth write/read circuits 19 to 22, a word select signal 64 outputted from the word select control circuit 23, and a read/write signal 27.

The respective write/read circuits 19 to 22 performs writing or reading data to the respectively corresponding byte memories i to 4 only when writing or reading data is indicated by the word select signal 64 outputted from the word select signal 64.

Next, explanation will be made on the operation of the conventional memory system shown in FIG. 1, FIG. 2 and FIG. 3.

In this memory system, 5-bit address and 8-bit data are used. The higher 3 bits of the 5-bit address specify the same rows of one or the other of the first to fourth byte memories 1 to 4 and the first to fourth parity memories 9 to 12, and the lower 2 bits specify one or the other of the first to fourth byte memories 1 to 4.

When a 5-bit address is inputted from the outside at the time of memory access, the higher 3 bits 24 among the 5-bit address are inputted to the first and second decoders 25 and 26, and the address lower bit 28 of 2 bits is inputted to the word select control circuit 23.

The first and second decoders 25 and 26 have quite the same logical configuration, have different positions on the memory configuration, though. By signals 250 and 260 of 8 bits obtained from the result of decoding of the address higher bits 24, the decoders 25 and 26 specify simultaneously the same rows of the respective byte memories 1 to 4.

When read/write signal 27 indicates reading, all of the contents in the same rows of the first to fourth byte memories 1 to 4 indicated by the signals 250 and 260 outputted from the first and second decoders 25 and 26 are read out and at the same time, they are inputted also to the first to the fourth parity calculation circuits 5 to 8. And the values of the parity bits in the same rows of the first to fourth parity memories 9 to 12 indicated by the first and second decoders 25 and 26 are read out by the respectively corresponding first to fourth parity calculation circuits 5 to 8.

The first to fourth parity calculation circuits 5 to 8 calculate parities of the data read out from the respectively corresponding byte memories 1 to 4, and compare the results with the parity bits read out from the respectively corresponding parity memories 9 to 12. In the case where even only one of the results of the comparison by the first to fourth parity calculation circuits 5 to 8 shows uncoincidence, the corresponding one of the first to fourth uncoincidence signals 13 to 16 becomes active, thereby the error signal 18 which is the output of the OR gate 17 also becomes active.

On the other hand, the address lower bit 28 of 2 bits is inputted to the word select control circuit 23. In this memory system, since 4-word continuous reading is performed, the word select control circuit 23 outputs a word select signal 64 indicating the word read order in accordance with a round robin method from the word indicated by the address lower bit 28.

Specifically, when the address lower bit 28 is "00", they are read from the first, word (first byte memory 1), when "01", from the second word (second byte memory 2), when "10", from the third word (third byte memory 3), and when "11", from the fourth word (fourth byte memory 4) respectively in order.

The data read out in the order of the indication from the first to fourth byte memories 1 to 4 by the corresponding first to fourth write/read circuits 19 to 22 are outputted to a data bus 29. But this operation is performed regardless of the error signal 18. Whether the data read out to the write/read circuits 19 to 22 are valid or invalid is judged outside of the memory system in accordance with the error signal 18.

In this way, in order to perform the continuous reading from the memory system smoothly, conventionally, the respective words are read out at the same time from the first to fourth byte memories 1 to 4 by the respectively corresponding first to fourth write/read circuits 19 to 22, and outputted to the data bus 29 in accordance with the order indicated by the round robin method by the word select control circuit 23. Therefore each of the first to fourth write/read circuits 19 to 22 is configured as a logical circuit corresponding to 8 bits.

When the read/write signal indicates writing, data is written from the data bus 29 to one or the other of the byte memories 1, 2, 3 and 4 to which only the circuit corresponding to the word indicated by the address lower bit 28 among the first to fourth write/read circuits 19 to 22 corresponds.

For example, when the address lower bit 28 is "10", only the third write/read circuit 21 is indicated by the word select signal 64 outputted from the word select control circuit 23. The third write/read circuit. 21 writes the word data on the data bus 29 into a row specified by the second decoder 26 in the third byte memory 3. Then the third parity calculation circuit 7 inputs data outputted in order to be written in the third byte memory 3 by the third write/read circuit 21 and calculate the parity, and writes the result in the parity bit in the row specified by the second decoder 26 of the third parity memory 11.

As aforementioned, in the conventional memory system including parity bits and capable of continuous reading, since it is necessary for the bits which are the targets of the parity calculation to be arranged in positions physically close to each other on a chip from the viewpoint of the limitation of the parity calculation and it is necessary that the memory elements are so arranged as to be able to read all the words at the same time from the view point of the limitation of the continuous reading, the memory configuration is decided from the limitations, leading to low flexibility of the memory configuration.

In such a conventional memory system as aforementioned, since the write/read circuits 19 to 22 are configured as the logical circuits of the number of bits corresponding to the number of bits of the byte memories 1 to 4, their occupied areas on a chip are large and their electric power consumption is large. Such problems become more obvious when a cache memory is configured by using a plurality of such conventional memory systems as aforementioned.

As the inventor has proposed the invention disclosed as Japanese Patent Application Laid-Open No. 3-147038 (1991) in consideration of such problems, explanation will be made on the Japanese Patent Application Laid-Open No. 3-147038 (1991) as the second prior art.

FIG. 4 is a block diagram showing a configuration of a cache memory of the invention disclosed in the aforementioned Japanese Patent Application Laid-Open No. 147038 (1991), and the cache memory is configured in a 4-way set associative method.

In the conventional example, one word is composed of 32 bits.

In FIG. 4, reference numeral 51 designates an address (request address) at a main memory (external memory) not shown in which data to be accessed requested by a data processor, and the address is composed of an address tag 51a, a set select 81b and a word select 51c from the higher side.

Numeral 82 designates an address tag memory composed of n-number of areas (hereinafter, each area is called an entry), in which the address tag 51a of the address 51 of data is stored in each entry. Four address tag memories 82 are provided to correspond to the respective 4 ways.

Numeral 53 designates a valid bit memory similarly composed of n-number of entries, in which data indicating valid/invalid of the data stored in the entries of the corresponding address tag memory 52 are stored. Four valid bit memories 53 are provided to correspond to the respective 4 ways.

Numeral 54 designates a data memory composed of number of entries. This data memory 54 is composed of 4 data areas of 54a, 54b, 54c and 54d each having been divided in unit of word. Further, each data area 54a, 54b, 54c and 54d is divided into areas for 32 bits from 0th bit to 31st bit for one word, and each one bit area is further divided into areas for 4 ways. FIG. 4 schematically shows that the 0th bit of the data area 54a of the word 1 is divided into areas corresponding to the respective ways A, B, C and D. Further, an area of each one way is divided into n number of entries.

Numeral 55 designates a word selector. In this cache memory system, the word selector 55 selects and operates the data areas 54a, 54b, 54c and 54d corresponding to the respective 4 words according to the word select 51c.

Numeral 59 designates a way selector, in which way select lines (in this example, 4 lines) 59a, 59b, 59c and 59d are provided corresponding to the respective ways. The 4 way select lines 59a, 59b, 59c and 59d are selected by a way select signal to be described later, and activated. An area for each way of each of the data area 54a, 54b, 54c and 54d is connected to a sense amplifier 56 and a write circuit 57 to be described later by a signal line through gate respectively. By that the way select lines 59a, 59b, 59c and 59d become active, the respective gates turn on to connect the respective sense amplifiers 56 or the write circuits 57 with the respective areas for the respective ways.

Numeral 58 designates an address tag comparator, which compares the address tag 51a of the request address 1 with data (address tag) stored in the entry specified by the set select 51b of each way of the address tag memory 52. When the comparison result indicates coincidence, the address tag comparator 58 outputs a hit signal. In addition, also four address tag comparators 58 are provided corresponding to the address tag memories 52, that is, to the respective 4 ways, and the way select signal is outputted to the way selector 59 from the address tag comparator 58 in which the comparison result indicates coincidence.

Each sense amplifier 56 is provided in an area for each bit of each of the data areas 54a, 54b, 54c and 54. The sense amplifier 56 amplifies a signal outputted from an area for a way selected by the way select signal, and outputs it to a data bus 60.

Numeral 57 designates a write circuit, and each write circuit 57 is provided in an area for each bit of each of the data areas 54a, 54b, 54c and 54d. The write circuit 57 inputs a signal inputted from the data bus 60 to an area for a way selected by the way select signal so as to write it.

Since the cache memory system disclosed in the Japanese Patent Application Laid-Open No. 3-147038 (1991) is so configured as mentioned above, the number of the sense amplifiers are the "number of bits in one word"×"the number of words", specifically,

32×4.

That is to say, in the cache memory in the conventional example, the number of the sense amplifiers is irrespective of the number of ways, and in case of increasing the number of ways, the number of sense amplifiers 56 is not to be increased.

The operation of such a cache memory of 4-way set associative method disclosed in the Japanese Patent Application Laid-Open No. 3-147038 (1991) is as follows.

Of the request address 51, the address tag 51a is inputted to the address tag comparator 58, the set select 51b to the address tag memory 52 and to the respective data areas 54a, 54b, 54c and 54d of the data memory 54, and the word select 51c to the word selector 55.

In each entry of the address tag memory 52 and the data memory 54, an address tag of an address requested from the data processor and a data block of 4 words read from the main memory by the address have been already stored.

Accessing to the address tag memory 52 and the data memory 54 is performed by specifying an entry address by the set select 51b. That is, the address tag stored in the entry of the address tag memory 52 selected by the set select 51b is read out, and given to the address tag comparator 58. And one or the other of the data areas 54a, 54b 54c and 54d of the data memory 54 is selected by the word selector 55 and becomes in an operation state.

For example, the data area 54a corresponding to the word 1 is assumed to be selected by the word select 51c. One entry, that is, a data block for 4 ways is selected by the set select 51b of the area of the word 1 of the data area 54a.

On the other hand, the address tag comparator 58 compares the address tag 51a of the request address 51 being requested at present from the data processor with an address tag read out from the address tag memory 52, and judges whether they are coincident with each other or not. When the result shows coincidence, the address tag comparator 58 outputs a hit signal as well as to output, the way select signal to the way selector 59.

By the way, as aforementioned, since the conventional cache memory system is of 4-way set associative method, four address tag memories 52 and four address tag comparators 53 are provided corresponding to the number of ways respectively. And the data memory 54 is divided into four data areas of 54a, 54b, 54c and 54d in unit of word, in each of which data corresponding to the number of ways are existed.

Accordingly, the address tag memory 52 and the data memory 54 can store four address tags and four data blocks at maximum to the same entries respectively. Since the respective ways of the address tag memory 52 perform the same operations in parallel, when the address tag comparator 58 judges that there is a hit (coincidence), four address tags are referred to at the same time for one entry address. That is, the address tag comparator 58 compares the address tags of the respective ways read out from the address tag memory 52 with the address tag 51a of the request address 51 being requested at present from the data processor for 4 ways at the same time so as to judge hit/cache miss.

On the other hand, in the data memory 54, the data areas 54a, 54b, 54c or 54d corresponding to one or the other words is selected by the word selector 55, and further, data for 4 ways are selected according to the entry address specified by the set select 51b.

When the way selector 59 receives from the address tag comparator 58 a way select signal showing which way has hit, the way selector 59 makes active the corresponding one of the way select lines 59a, 59b, 59c and 59d. Thereby, since the selected way is connected with the sense amplifier 56 and the write circuit 57, the data corresponding to the request address 51 is outputted from the data memory 54 to the sense amplifier 56 so as to be amplified, and outputted to the data bus 60.

In the conventional example as aforementioned, explanation was made on the cache memory of 4-way, however, any number will do for the way number when it is 2 or more.

As aforementioned, in the memory system including conventional parity bits and capable of continuous reading, bits which are the targets of parity calculation must be allocated to memory elements physically close to each other on a chip from the viewpoint of the limitation of the parity calculation, and the memory elements must be arranged so that all the words can be read at the same time from the viewpoint of the limitation of the successive read, thereby, the memory configuration is decided from these limitations, leading to low flexibility of the memory configuration.

In the conventional cache memory disclosed in the Japanese Patent Application Laid-Open No. 3-147038 (1991) dealing with problems of large occupied areas of the write/read circuits on a chip and of large electric power consumption because the write/read circuits, particularly the sense amplifiers are configured as logical circuits by the number corresponding to the number of bits of the byte memories, there is such a problem that the parity configuration is not taken into consideration.

SUMMARY OF THE INVENTION

The present invention has been devised in such circumstances, and the object thereof is to provide a memory system and cache memory system improving the flexibility of the memory configuration by relaxing the limitation of the arrangement of bits which are the targets of the parity calculation, and reducing the occupied areas of the write/read circuits, particularly the sense amplifiers on a chip as well as reducing the electric power consumption.

A memory system related to the invention is characterized by that the data storing means is configured so that the data in unit of word, which are the targets of the parity calculation done by parity calculating means, occupy the same bit positions as those of a predetermined number of data in unit of word respectively, and that connecting means is provided for selectively connecting to a data bus the bit positions of the data in unit of word, selected by word selecting means in such data storing means.

A cache memory system related to the present invention is characterized by that the data storing means is configured so that the data in unit of word, which are the targets of the parity calculation done by the parity calculating means, occupy the same bit positions as those of the data in unit of word in the respective 4 ways in the same word, and that connecting means is provided further for selectively connecting to a data bus the bit positions of the data in unit of word, selected by the way selecting means and word selecting means in such data storing means.

In the cache memory of the invention, since the data which are the targets of parity calculation are of the same bits of a plurality of words, not of units of words, only the bits of the word selected by the word selecting means are selectively connected to the data bus so as to be outputted in a selected order.

In the cache memory system related to the invention, since the data which are the targets of the parity calculation are of the same bits of the same word of all the ways, only the bits of the word selected by the word selecting means among ways selected by the way selecting means are selectively connected to the data bus so as to be outputted in a selected order.

The above and further objects and features of the invention will more fully be apparent from the following detailed description with accompanying drawings.

DESCRIPTION OF THE PREFERRED EMBODIMENTS

Figure 1:
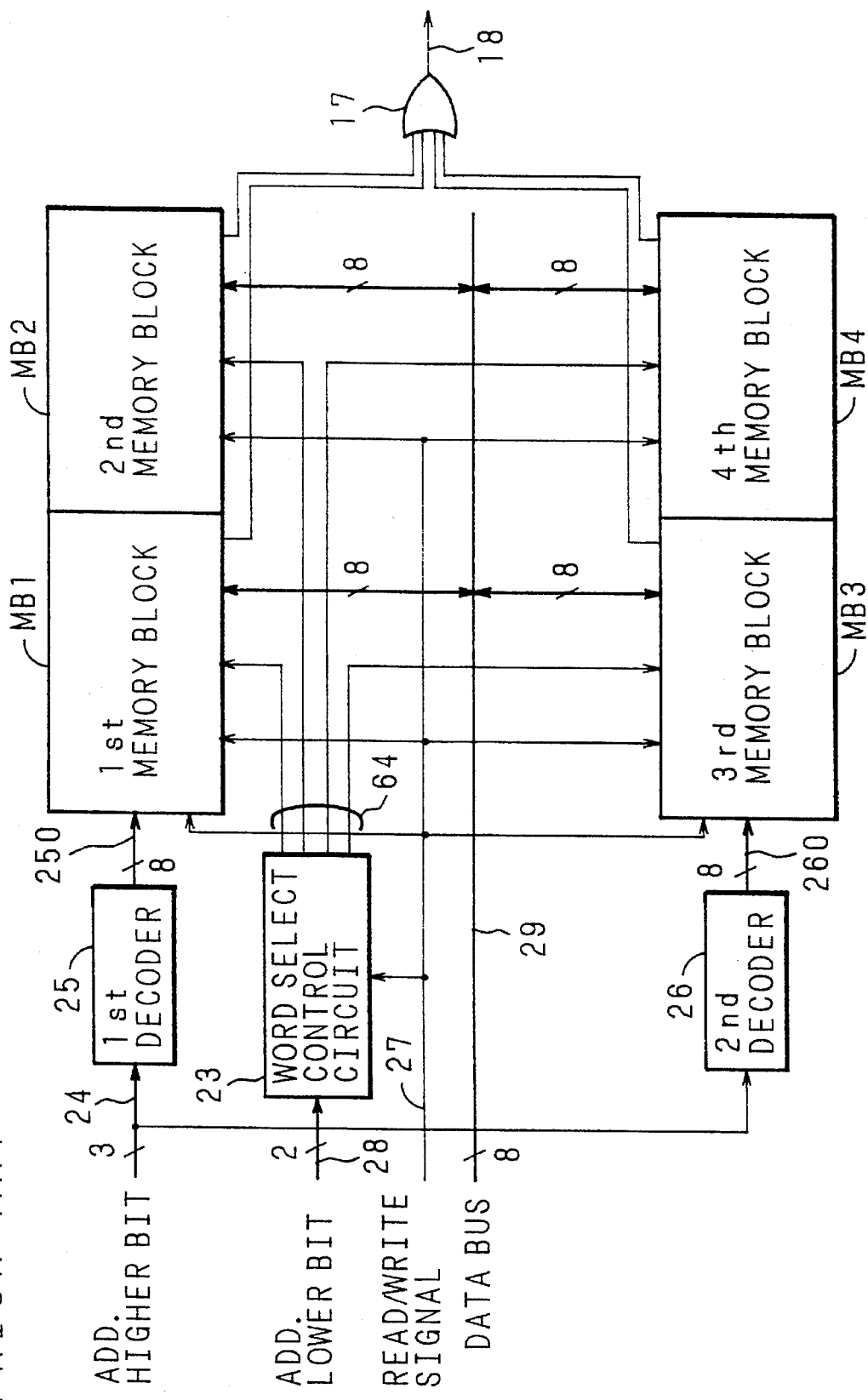
FIG. 1 is a block diagram showing an example of a whole configuration of a conventional memory system.

In the following, explanation will be made on the invention, referring to the drawings showing the embodiments thereof.

Figure 5:
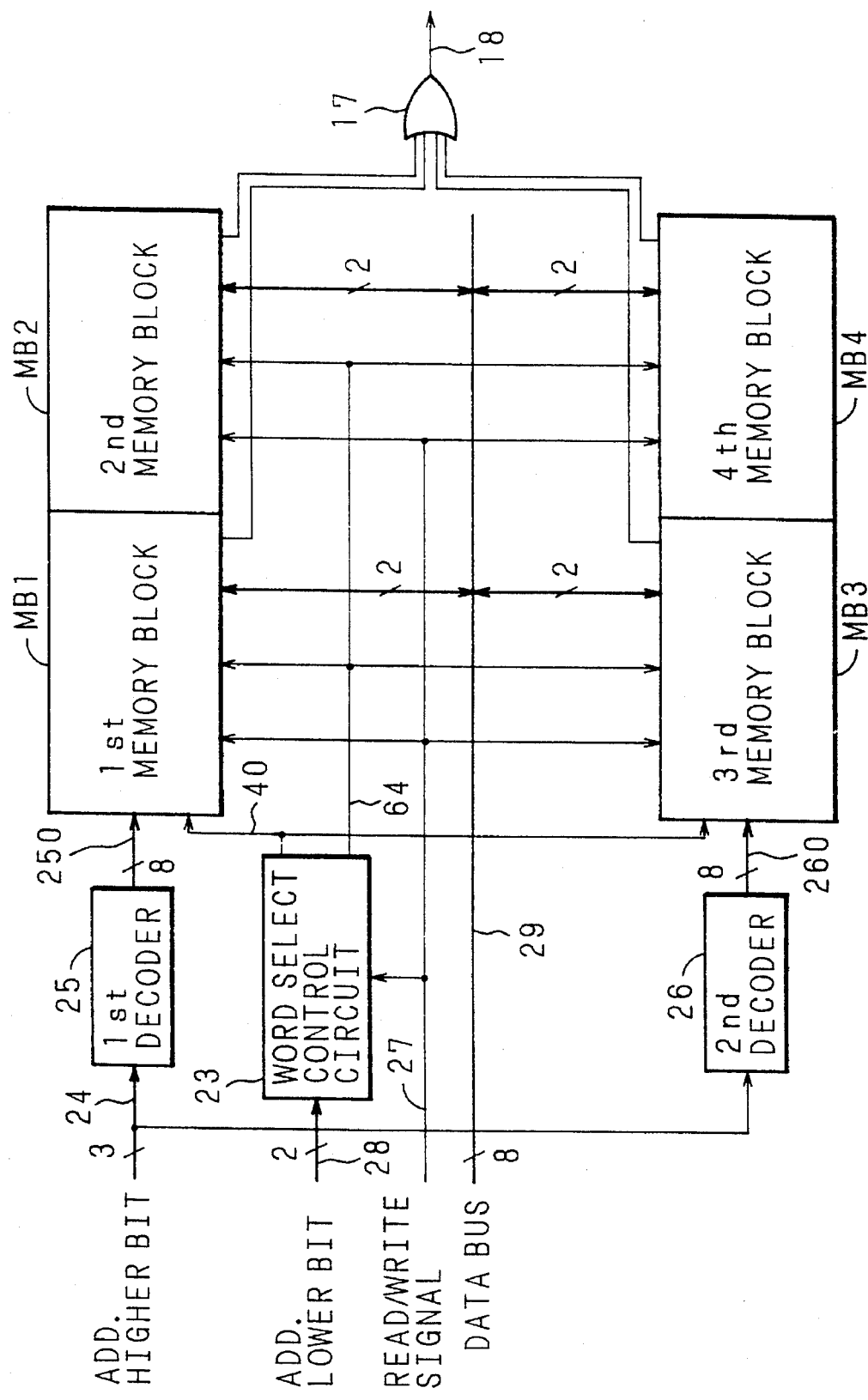
FIG. 5 is a block diagram showing an example of a whole configuration of a memory system related to the invention.
Figure 6:
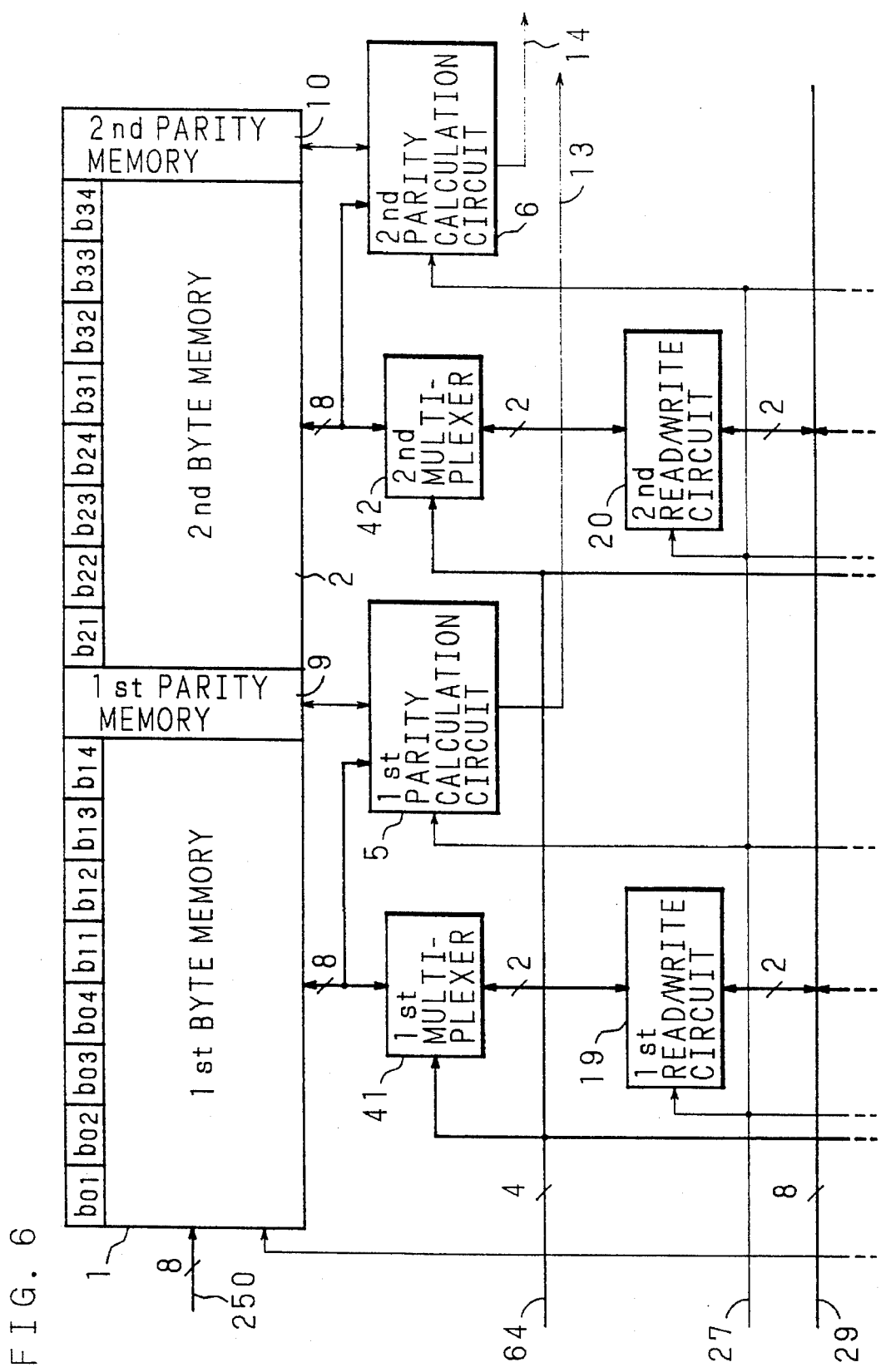
FIG. 6 is a block diagram showing an example of a configuration of a memory system related to the invention.
Figure 7:
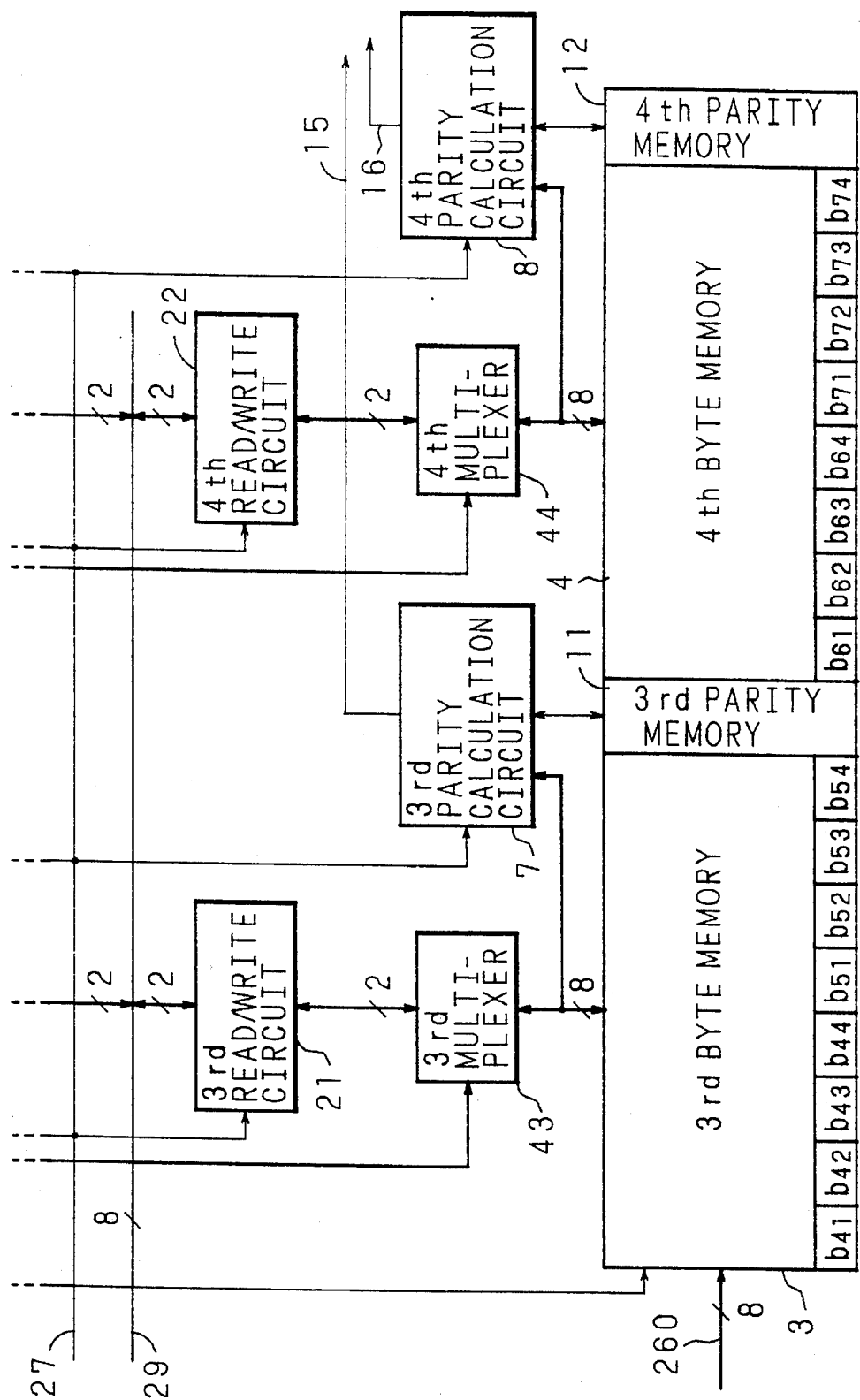
FIG. 7 is a block diagram showing an example of a configuration of a memory system related to the invention.

In the block diagrams in FIG. 5, FIG. 6 and FIG. 7, a configuration of a memory system as one embodiment of a first invention of the invention is shown.

In FIG. 6, a first memory block MB1 and a second memory block MB2 in the whole configuration shown in FIG. 5 are shown, and in FIG. 7, a third memory block MB3 and a fourth memory block MB4 in the whole configuration shown in FIG. 5 are shown. Each of the first to fourth memory blocks MB1 to MB4 is composed of first to fourth byte memories 1 to 4, first to fourth write/read circuits 19 to 22, first to fourth parity memories 9 to 12, first to fourth parity calculation circuits 5 to 8, and first to fourth multiplexers 41 to 44.

The memory system of the invention shown in FIG. 5, FIG. 6 and FIG. 7 is capable of reading 4 words successively. One word is one bytes (8 bits), and one parity bit of one bit corresponds to one byte. The parity bits are calculated and stored at the time when data is written in the memory. When data is read from the memory, the parity of the content of the data read from the memory is calculated, and the result is compared with a value of the parity bit corresponding to the data. At that time, when parities are not coincident, the fact is informed to the outside.

In the block diagrams shown in FIG. 5, FIG. 6 and FIG. 7, the arrangement of each part of the memory system is taken into consideration.

Each of the first to fourth byte memories 1 to 4 is made to be composed of 8 rows, and each byte memory stores 8-bit data for 8 rows in unit of row. In addition, each of the byte memories 1 to 4 is of non-destructive type.

Figure 2:
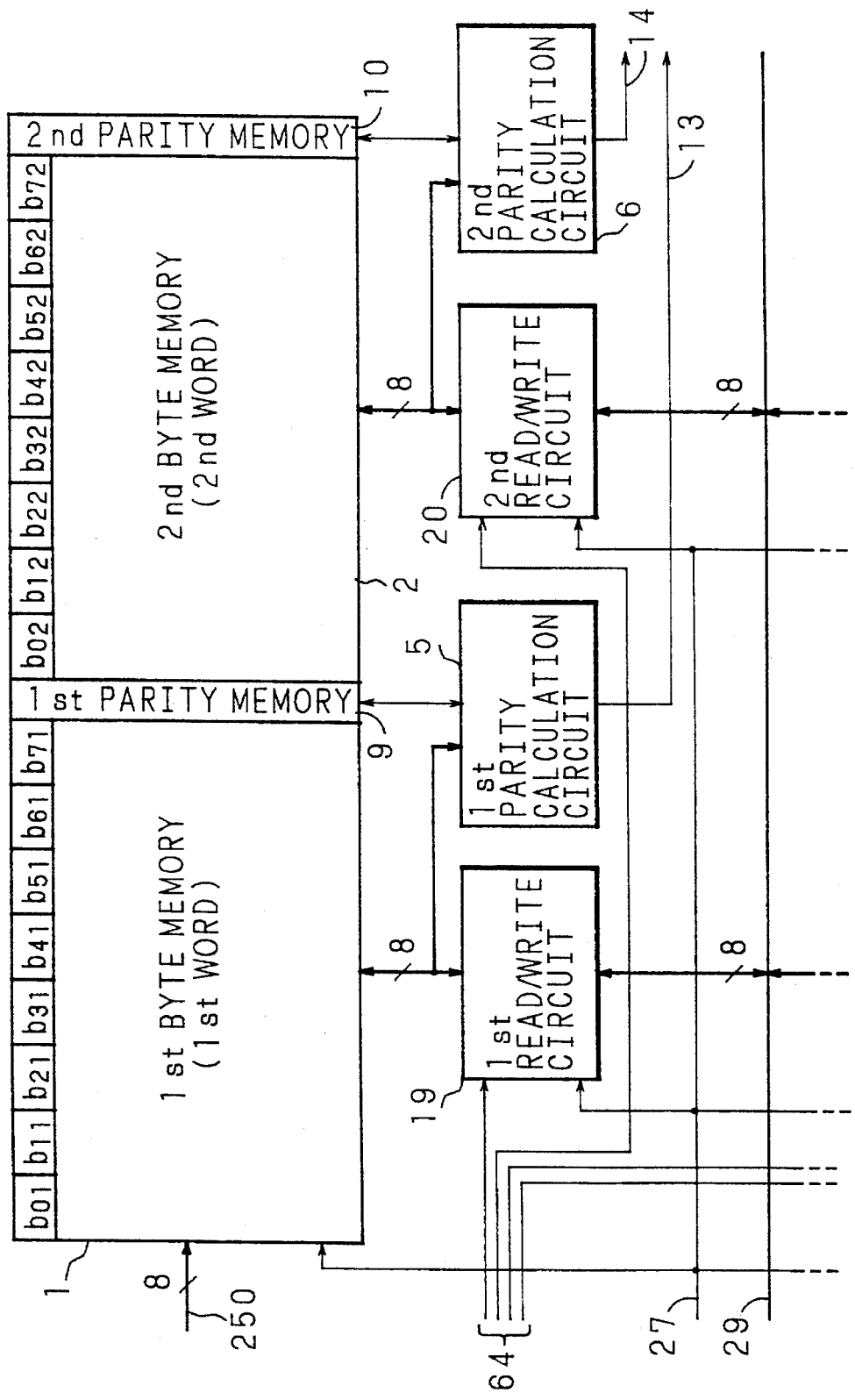
FIG. 2 is a block diagram showing an example of a configuration of a conventional memory system.
Figure 3:
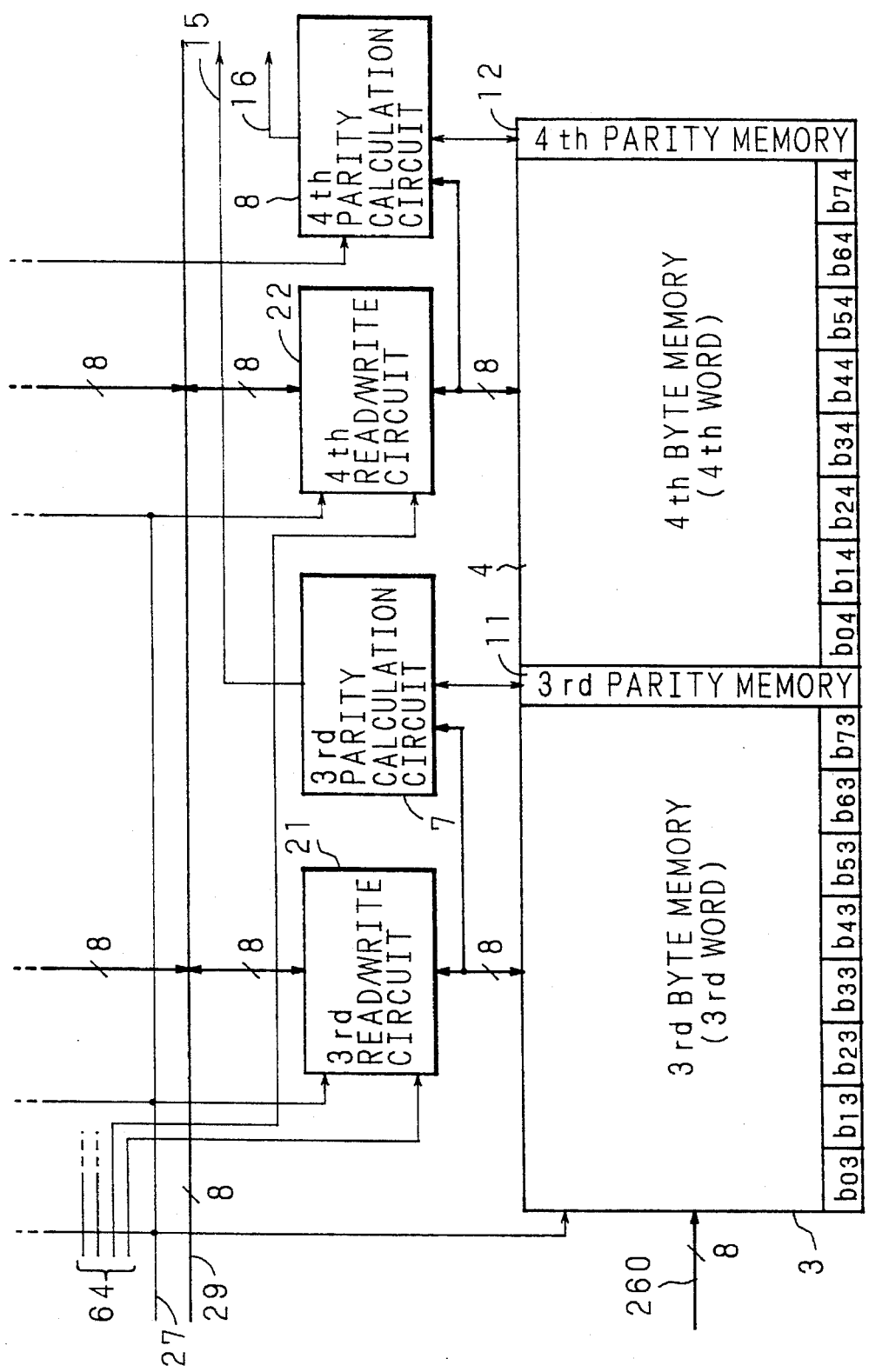
FIG. 3 is a block diagram showing an example of a configuration of a conventional memory system.

In a prior art shown in the aforementioned FIG. 1, FIG. 2 and FIG. 3, each of the byte memories 1 to 4 stores data of one word, however, in the embodiment of the invention, every 2 bits from each word of data of 4 words are stored in each byte memory 1 to 4. For example, in the first byte memory 2, the respective bit 0 and bit 1 of the data of the first to fourth words are stored.

In the first byte memory 1 shown in FIG. 6, "0" of "$b_{01}$", for example, indicates bit 0 and "1" indicates the first, word, respectively.

In each row of each of the byte memories 1 to 4, parity bit of one bit, is arranged to be accessed simultaneously, and the parity bits of the respective bits corresponding to the respective byte memories 1 to 4 configure the respective first to fourth parity memories 9 to 12.

The parity calculation are performed by the first to fourth parity calculation circuits 5 to 8 corresponding to the respective data of 8 bits stored in unit of row in the first to fourth byte memories 1 to 4, and the calculation results are made to be stored in the same rows as those of the corresponding data of the respective parity memories 9 to 12. At the time when data is read from the first to fourth byte memories 1 to 4 in unit of row, the first to Fourth parity calculation circuits 5 to 8 calculate parities from the contents of the data read out from the respective byte memories 1 to 4, and compare these calculation results with the values of the parity bits in the same rows as those the corresponding data of the respective parity memories 9 to 12 so as to output first to fourth uncoincidence signals 13 to 16.

The first to fourth uncoincidence signals 13 to 16 show that the data read out from the corresponding byte memories 1 to 4 or the values read out for the parity memories 9 to 12 are not reliable by being active when the comparison results show uncoincidence.

These first to fourth uncoincidence signals 13 to 16 are logical-summed by the OR gate 17 and outputted to the outside as an error signal 18.

The writing and reading of data to and from the first to fourth byte memories 1 to 4 are controlled by the first to fourth write/read circuits 19 to 22, a read allowance signal 40 and word select signal 64 outputted from a word select control circuit 23, first to fourth multiplexers 41 to 44, and a read/write signal 27.

The respective multiplexers 41 to 44 connect the respective byte memories 1 to 4 and the respectively corresponding write/read circuits 19 to 22 only concerning the bits of the word specified by the word select signal 64 outputted from the word select control circuit 23. The respective write/read circuits 19 to 22 perform writing or reading of data in accordance with the read/write signal 27.

When the read allowance signal 40 is given, the respective byte memories 1 to 4 and the parity memories 9 to 12 output data to the respectively corresponding first to fourth byte memories 1 to 4 and first to fourth parity calculation circuits 5 to 8.

Next, explanation will be made on the operation of the embodiment of the memory system of the invention shown in FIG. 5, FIG. 6 and FIG. 7.

The memory system of the invention shown in FIG. 5, FIG. 6 and FIG. 7 uses B-bit address and 8-bit data. The higher 3 bits among the 5-bit address specifies one or the other row among the first to fourth byte memories 1 to 4 and the first to fourth parity memories 9 to 12, and the lower 2 bits specifies one or the other byte.

In memory accessing, when an address of 5 bits is inputted from the outside to the memory system shown in FIG. 5, FIG. 6 and FIG. 7, the address higher bit 24 of 3 bits among the 5-bit address is inputted to the first and second decoders 25 and 26, and the address lower bit 28 of 2 bits is inputted to the word select control circuit 23.

The first and second decoders 25, 26 have totally the same configuration logically, have different positions of the memory configuration, though, and specify the same rows in the respective byte memories 1 to 4 by signal 250, 260 obtained by decoding the higher bits 24 of the address.

When the read allowance signal 40 is active irrespective of the read/write signal 27, the contents in the same rows specified by the signals 250 and 260 outputted from the first and second decoders 25 and 26 of the first to fourth byte memories 1 to 4 and first to fourth parity memories 9 to 12, are outputted to the respectively corresponding parity calculation circuits 5 to 8 and the multiplexers 41 to 44.

When read/write signal 27 specifies reading, the first to fourth parity calculation circuits 5 to 8 calculate parities of the data outputted from the respectively corresponding byte memories 1 to 4, and compare the calculation results with the parity bits read out from the respectively corresponding parity memories 9 to 12. When any one of the comparison results done by the first to fourth parity calculation circuits 5 to 8 shows uncoincidence, since the corresponding uncoincidence signal 13 to 16 becomes active, the error signal 18 which is the output of the OR circuit 17 also becomes active.

On the other hand, the address lower bit 28 of 2 bits is inputted to the word select circuit 23. In the memory system of the invention, since the 4-word continuous reading is performed, the word select circuit 23 outputs the word select signal 64 specifying the word read order from the word specified by the address lower bit 28 in accordance with round robin method.

Specifically, the word order is first, second, third and fourth, when the address lower bit 28 is "00", second, third, fourth and first, when "01", third, fourth, first and second, when "10", and fourth, first, second and third, when "11".

The indication of word selection by the word select signal 64 outputted from the aforementioned word select control circuit 23 is inputted to the first to fourth multiplexers 41 to 44. The respective multiplexers 41 to 44 connect only the bits of the word specified by the word select signal 64 of the respectively corresponding byte memories 1 to 4 to the respectively corresponding write/read circuit 19 to 22.

For example, when the address lower bit 28 is "00", since the word order is first,, second, third and fourth word, at first, in the first multiplexer 41, $b_{01}$ and $b_{11}$ which are the bits of the first word of the first byte memory 1 are connected to the first write/read circuit 19, in the second multiplexer 42, $b_{21}$ and $b_{31}$ which are the bits of the first word of the second byte memory 2 are connected to the second write/read circuit 20, in the third multiplexer 43, $b_{41}$ and $b_{51}$ which are the bits of the first word of the third byte memory 3 are connected to the third write/read circuit 21, and in the fourth byte memory, $b_{61}$ and $b_{71}$ which are the bits of the first word of the fourth byte memory 4 are connected to the fourth write/read circuit 22, respectively.

Thereby, from each of the write/read circuits 19 to 22 to the data bus 29, 8 bits of $b_{01}$ to $b_{71}$ of the first word are outputted.

Next, in the first multiplexer 41, $b_{02}$ and $b_{12}$ which are the bits of the second word of the first byte memory 1 are connected to the first write/read circuit 19, in the second multiplexer 42, $b_{22}$ and $b_{32}$ which are the bits of the second word of the second byte memory 2 are connected to the second write/read circuit 20, in the third multiplexer 43, $b_{42}$ and $b_{52}$ which are the bits of the second word of the third byte memory 3 are connected to the third write/read circuit 21, and in the fourth multiplexer 44, $b_{62}$ and $b_{72}$ which are the bits of the second word of the fourth byte memory 4 are connected to the fourth write/read circuit 22, respectively.

Thereby, 8 bits of $b_{02}$ to $b_{72}$ of the second word are outputted from each of the write/read circuits 19 to 22 to the data bus 29.

In the same way, next, 8 bits of $b_{03}$ to $b_{73}$ of the third word are outputted from each of the write/read circuits 19 to 22 to the data bus 29, and, further, 8 bits of $b_{04}$ to $b_{74}$ of the fourth word from each of the write/read circuits 19 to 22 in order.

In addition, outputting of data at this time to the data bus 29 is performed irrespective of the error signal 18, and whether the read-out data is processed as valid data or invalid data is judged outside of the memory system in accordance with the error signal 18.

In this way, in the abovementioned embodiment, in order to perform continuous reading from the memory system smoothly, all of the data are read out simultaneously from the first to fourth byte memories 1 to 4 and words are specified in order by the word select control circuit 23 while the bits of the same words are selected by the multiplexers 41 to 44 to be outputted to the data bus 29. Therefore, although hardware for logical circuits for configuring four multiplexers 41 to 44 increase, since each of the first to fourth write/read circuits 19 to 22 can be configured with a logical circuit corresponding to 2 bits, the occupied area becomes smaller at the time of layout on a chip. At the same time, load of the data bus 29 also becomes smaller.

When the read/write signal 27 specifies writing, each of the parity calculation circuits 5 to 8 temporarily latches data outputted from the rows of each of the byte memories 1 to 4 specified by the decoders 25 and 26 without parity calculation. The respective multiplexers 41 to 44 connect the respective byte memories 1 to 4 with the respective corresponding write/read circuits 19 to 22 concerning only the bits corresponding to the word indicated by the address lower bit 28, in other words, by the word select control circuit 23. In this state, each of the write/read circuits 19 to 22 write data to each of the byte memories 1 to 4 from the data bus 29 through each of the multiplexers 41 to 44.

For example, when the address lower bit 28 is "10", the first to fourth multiplexers 41 to 44 connect the respective byte memories 1 to 4 with the respectively corresponding write/read circuits 19 to 22 concerning only bits $b_{03}$, $b_{13}$, $b_{23}$, $b_{33}$, $b_{43}$, $b_{53}$, $b_{63}$ and $b_{73}$. In this state, the respective write/read circuits 19 to 22 write the data on the data bus 29 to the aforementioned bit positions on the specified rows of the respective byte memories 1 to 4.

At this time, the respective parity calculation circuits 9 to 12 input data written through the respective multiplexers 41 to 44 to rewrite only the same bit positions as those of the data which was latched before, calculate parities of new data written after that, and write the results to the specified rows of the respective parity memories 9 to 12.

Figure 8:
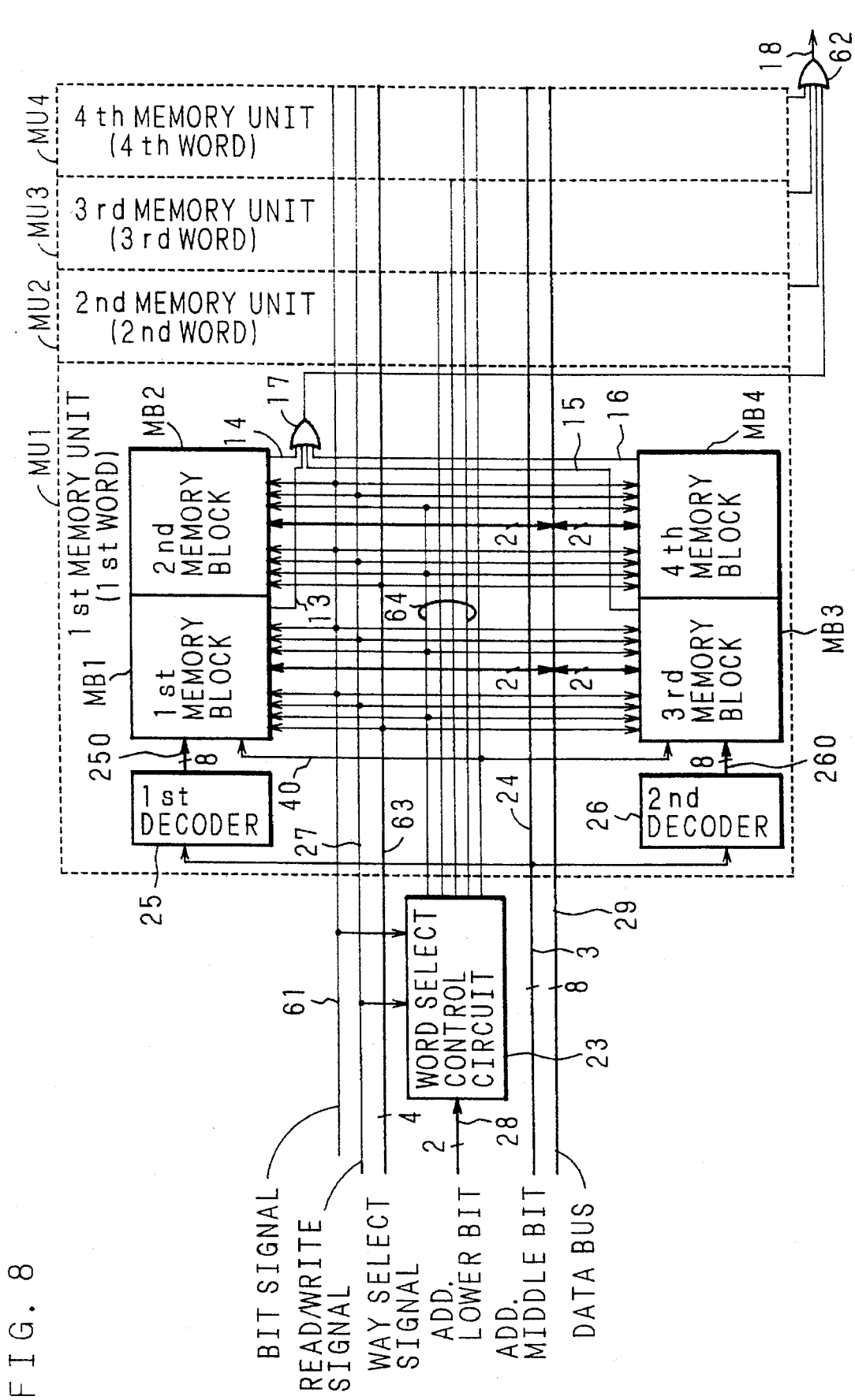
FIG. 8 is a block diagram showing an example of a whole configuration of a cache memory system related to the invention.
Figure 9:
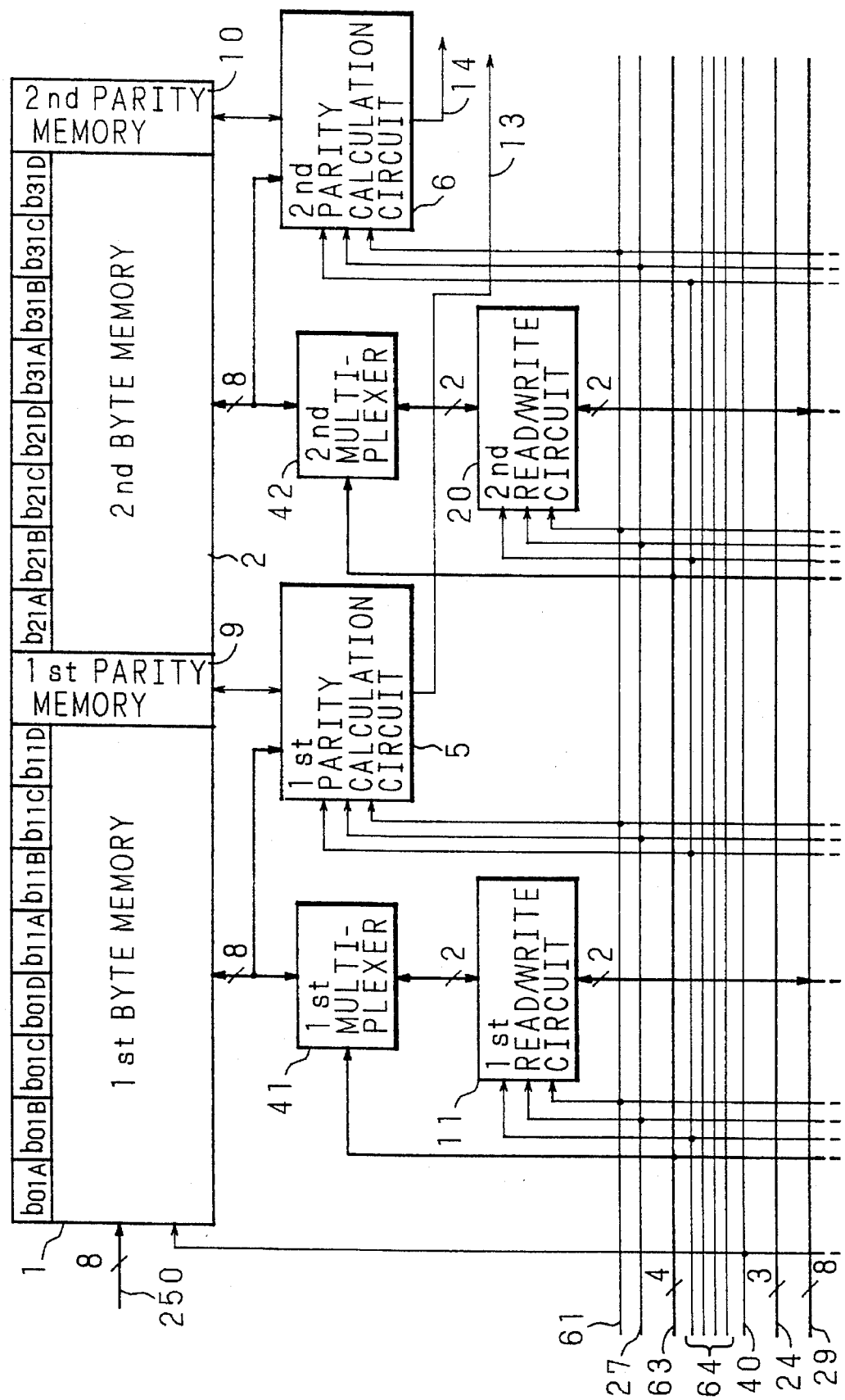
FIG. 9 is a block diagram showing an example of a configuration of a cache memory system related to the invention.
Figure 10:
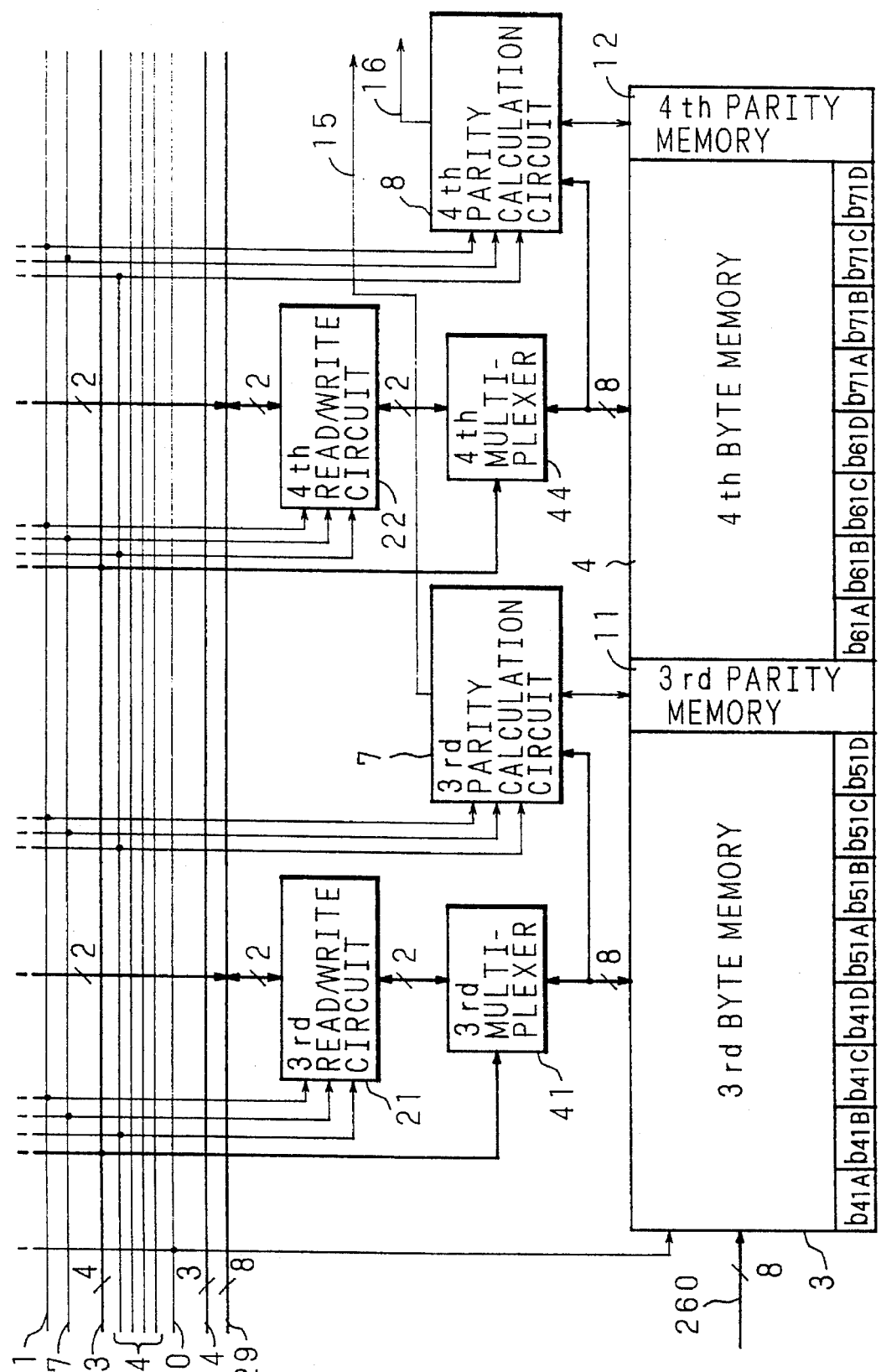
FIG. 10 is a block diagram showing an example of a configuration of a cache memory system related to the invention.

Next, explanation will be made on an embodiment of a second invention in the case where the memory system of the invention shown in FIG. 5, FIG. 6 and FIG. 7 is adopted in the cache memory system, referring to block diagrams of FIG. 8, FIG. 9 and FIG. 10 showing a configuration example thereof.

A cache memory is a buffer memory for filling a gap of access time between the main memory and the microprocessor. In the cache memory, a copy of a part of the stored contents of the main memory (not shown) is stored. When the data which the microprocessor (not shown) accesses is already stored in the cache memory, the cache memory hits so as to transmit and receive data between itself and the microprocessor. Whether or not, the cache memory stores the data which the microprocessor accesses, or hit/miss is judged in a tag memory (not shown).

Figure 4:
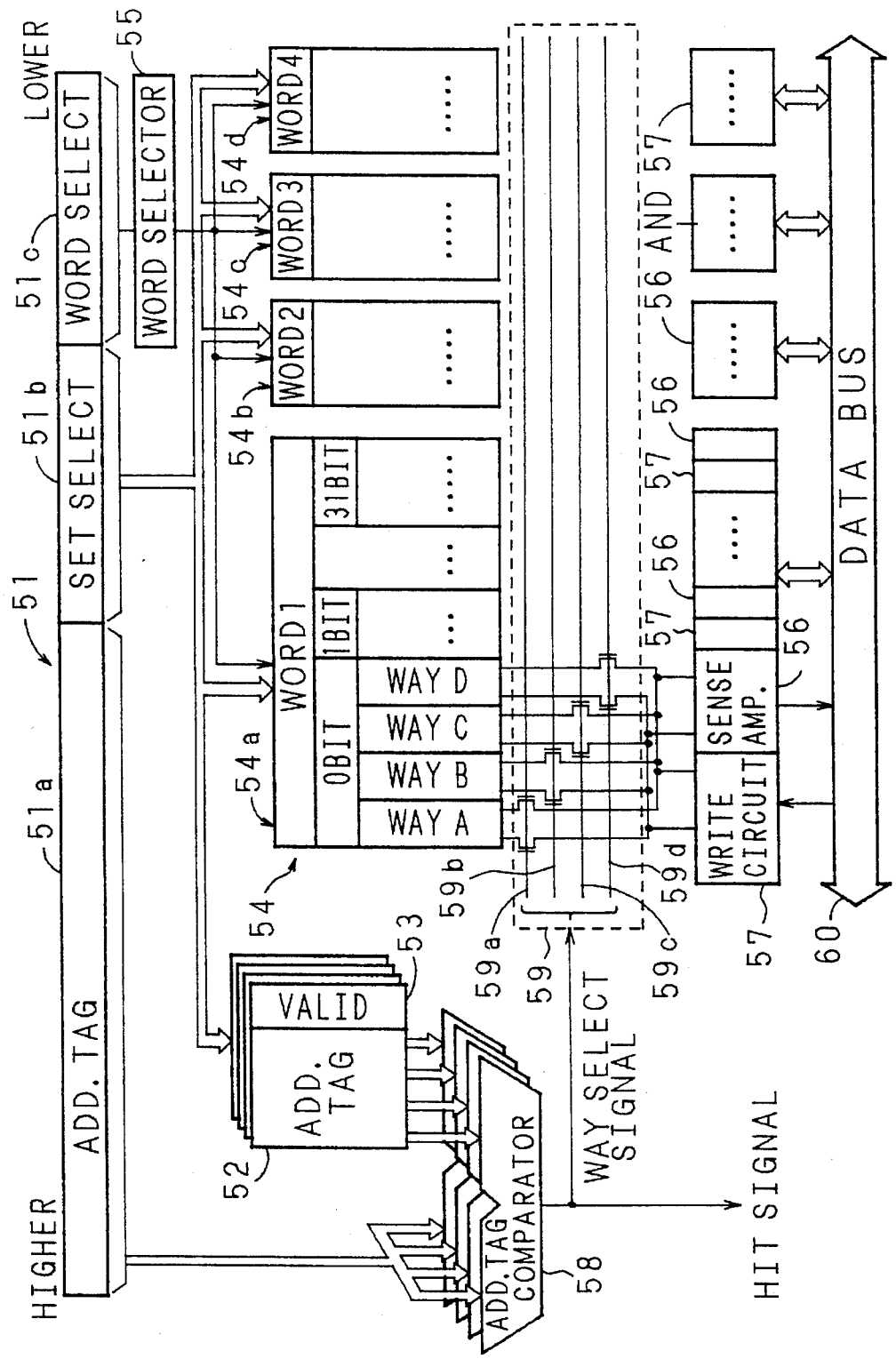
FIG. 4 is a block diagram showing an example of a configuration of a conventional cache memory system.

The tag memory stores a part of an address (in the conventional example shown in the aforementioned FIG. 4, it corresponds to the address tag 51a among the request address 51, and in the following embodiments of the invention, it corresponds to the higher 3 bits among the 8-bit address) of the data stored in the cache memory. When an accessing is performed from the microprocessor, the tag memory compares the access address with a part of the address which is stored the tag memory itself. When the comparison result shows coincidence, the tag memory judges it to be a hit and makes the hit signal 61 become active, and the result shows uncoincidence, the tag memory judges it to be a miss and makes the hit signal 61 become non active.

More specifically, the microprocessor requests read access, and when the data is not stored in the cache memory, it is a read miss. Then the cache memory reads out the data of a plurality of words (in the following embodiments of the invention, 4 words) including the data which is requested by the microprocessor from the main memory or lower cache memory to send it to the microprocessor as well as to store it in itself.

In FIG. 9, a first memory block MB1 and a second memory block MB2 in the whole configuration shown in FIG. 8 are shown. In FIG. 10, a third memory block MB3 and a fourth memory block MB4 in a whole configuration shown in FIG. 8 are shown. Each of the first to fourth memory blocks MB1 to MB4 are composed of the respective first to fourth byte memories 1 to 4, first to fourth write/read circuits 19 to 22, first to fourth parity memories 9 to 12, first to fourth parity calculation circuits 5 to 8, and first to fourth multiplexers 41 to 44.

The cache memory system of the invention shown in FIG. 8, FIG. 9 and FIG. 10 performs 4-word continuous reading at the time of read hit. In addition, in this embodiment, since a 4-way set associative method is adopted, the 4 ways are called way A, way B, way C and way D. The embodiment is composed of 4 memory units of reference characters MU1 to MU4 with a memory system of almost the same as the one shown in FIG. 5, FIG. 6 and FIG. 7 as one unit.

And, since each of the memory units MU1 to MU4 has the same configuration with each other, in FIG. 9 and in FIG. 10, an internal configuration of only the memory unit MU1 is shown and the internal configurations of the other memory units MU2 to MU4 are omitted.

Here, in the same way as in the aforementioned, one word is one byte (8 bits), and a parity bit of one bit corresponds to one byte. The parity bit is calculated and stored when data is written in the memory. When there is a read hit, and at the time when data is read out from the memory, the parity of the content of the data to be read out from the memory is calculated, and by comparing the calculation result with a value of the parity bit corresponding to the data, the data reliability is guaranteed. At the time of read hit, when the parities are not coincident with each other, the fact is informed to the outside.

The arrangement of each part of the memory system is taken into consideration in the block diagrams shown in FIG. 8, FIG. 9 and FIG. 10.

Each of the first to fourth byte memories 1 to 4 of each of the memory units MU1 to MU4 is configured to have 8 rows, and each byte memory stores 8 rows of 8-bit data in unit of row. In addition, each byte memory 1 to 4 is non-destructive read type.

In the prior art shown in the aforementioned FIG. 1, FIG. 2 and FIG. 3, each of the byte memories 1 to 4 stores each one word data, however, in this embodiment, each of the memory units MU1 to MU4 stores each of the first to fourth words, and further, in each of the memory units MU1 to MU4, every 2 bits of the four ways are stored in each of the byte memories 1 to 4. For example, in the second byte memory 2 of the memory unit MU1, bit 2 of the data of the first word of each of the ways A to D and bit 3 ($b_{21A}$, $b_{21B}$, $b_{21C}$ and $b_{21D}$, and $b_{31A}$, $b_{31B}$, $b_{31C}$ and $b_{31D}$) are stored.

In the second byte memory 2 shown in FIG. 9, for example, "2" of "$b_{21A}$" shows bit 2, "1" shows the first word, and "A" shows the way A.

In each row of the byte memories 1 to 4, a parity bit of one bit is arranged so as to be accessed at the same time, and parity bits of 8 bits corresponding to each of the byte memories 1 to 4 configures each of the first to fourth parity memories 9 to 12.

The parity calculation are performed by the first to fourth parity calculation circuits 5 to 8 corresponding to each data of 8 bits stored in each of the first to fourth byte memories 1 to 4 in unit of row, and each result is made to be stored in a parity bit in the same row as that of the data which each of the parity memories 9 to 12 corresponds. At the time when data is read out in unit of row from the first to fourth byte memories 1 to 4, each of the first to fourth parity calculation circuits 5 to 8 calculates the parity from the content of the data read out from each of the byte memories 1 to 4, and compares each of these calculation results with a value of the parity bit in the same row as that of the data which each of the parity memories 9 to 12 corresponds so as to output each of first to fourth uncoincidence signals 13 to 16.

The first to fourth uncoincidence signals 13 to 16 indicates that, the data read out from the respectively corresponding byte memories 1 to 4 or the values of the parity bits read out from the parity memories 9 to 12 are not reliable by becoming active when the respective comparison results indicate uncoincidence.

These first to fourth uncoincidence signals 13 to 16 are logical summed by the OR circuit 17, and further, the output signals of the OR circuit 17 of the respective memory units MU1 to MU4 are logical summed by the OR circuit 62 and outputted to the outside as an error signal 18.

Writing and reading data to and from each of the first to fourth byte memories 1 to 4 are controlled by the first to fourth write/read circuits 19 to 22, a read allowance signal 40 and a word select signal 64 outputted from the word select control circuit 23, first to fourth multiplexers 41 to 44, a read/write signal 27, a way select signal 63, and a hit signal 61.

The way select signal 63 indicates a result of a hit/miss judgment in a tag memory (not shown), and only a signal indicating a hit way becomes active and is given to the first to fourth multiplexers 41 to 44 of each of the memory units MU1 to MU4.

Each of the write/read circuits 19 to 22 controls writing data to each of the byte memories 1 to 4 or reading data from each of the byte memories 1 to 4 in accordance with the read/write signal 27, word select signal 64 and hit signal 61.

In addition, when the read allowance signal 40 is given, data is outputted from each of the byte memories 1 to 4 and the parity memories 9 to 12 to each of the corresponding write/read circuits 19 to 22 and parity calculation circuits 5 to 8.

Next, explanation will be made on the operation of the embodiment of the cache memory system of the invention shown in FIG. 8, FIG. 9 and FIG. 10.

The cache memory system of the invention shown in FIG. 8, FIG. 9 and FIG. 10 uses 8-bit address and 8-bit data. The higher 3 bits among the address of 8 bits are used for hit/miss judgment as a tag address. The middle 3 bits specify one or the other row among the first to fourth byte memories 1 to 4 and the parity memories 9 to 12, and the lower 2 bits specify one or the other byte.

At the time of memory accessing, when an address of 8 bits is inputted from the outside to the cache memory system shown in FIG. 8, FIG. 9 and FIG. 10, the higher address of 3 bits is given to the tag memory (not shown) so as to be used for hit/miss judgment. When it is a hit, the hit signal 61 becomes active, and when it is a miss, the hit signal 61 becomes non active.

The address middle bit of 3 bits (same as the address higher bit of 3 bits shown in the aforementioned FIG. 5) 24 of 3 bits is inputted to the first and second decoders 25 and 26 of each of the memory units MU1 to MU4, and the address lower bit 28 of 2 bits is inputted to the word select control circuit 23.

The first and second decoders 25 and 26 have totally the same logical configuration, have different positions on memory configuration, though, and specify the same rows of the byte memories 1 to 4 at the same time in each of the memory units MU1 to MU4 by the 8-bit signals 250 and 260 obtained by decoding the address middle bit 24 of the address.

When the read allowance signal 40 is active irrespective of the read/write signal 27, in each of the memory units MU1 to MU4, the contents in the same row specified by the signals 250 and 260 outputted from the first and second decoders 25 and 26 of the first to fourth byte memories 1 to 4 and first to fourth parity memories 9 to 12, are outputted to the respectively corresponding parity calculation circuits 5 to 8 and the multiplexers 41 to 44.

In the tag memory (not shown), when an address is inputted, the hit/miss judgment in every way is performed by the higher 3 bits of the address. When there is a hit, the hit signal 61 and the way select signal 63 indicating the hit way become active. When there is a miss, all of the hit signal 61 and the way select signal 63 become non active.

When the read/write signal 27 indicates reading, and, for example, the way A hits (read hit), in each of the memory units MU1 to MU4, the first to fourth parity calculation circuits 5 to 8 of the memory unit MU1 corresponding to the first word calculate the parities of the data read out from the respectively corresponding byte memories 1 to 4 and compare them with the parity bits read out, from the respectively corresponding parity memories 9 to 12. When anyone of the comparison results done by the first to fourth parity calculation circuits 5 to 8 in each of the memory units MU1 to MU4 becomes uncoincidence, the corresponding uncoincidence signals 13 to 16 becomes active, thereby the output signal of the OR circuit 17 of each of the memory units MU1 to MU4 also becomes active, and further, the error signal 18 which is the output of the OR circuit 62 also becomes active.

On the other hand, the way select signal 63 is inputted to the first to fourth multiplexers 41 to 44 of each of the memory units MU1 to MU4. When the way A hits, only the way select signal 63 indicating the way A becomes active, and in each of the memory units MU1 to MU4, only the bits of the way A of each of the byte memories 1 to 4 are selected by each of the multiplexers 41 to 44 so as to be outputted to the write/read circuits 19 to 22.

The address lower bit 28 of 2 bits is inputted to the word select control circuit 23. In the cache memory system of the invention, since 4-word continuous reading is performed, the word select control circuit 23 specifies the read order of the words by the word select signal 64 from the word specified by the address lower bit 28 in accordance with the round robin method.

Specifically, when the address lower bit 28 is "00", the word read order is first, second, third and fourth word. In other word, the order is indicated in the order of the memory unit MU1, MU2, MU3 and MU4. When the address lower bit 28 is "01", the word order is second, third, fourth and first, in other words, the order is indicated in the order of the memory unit MU2, MU3, MU4 and MU1. When the address lower bit 28 is "10", the word order is third, fourth, first and second, in other words, the order is indicated in the order of the memory unit MU3, MU4, MU1 and MU2. When the address lower bit 28 is "11", the word order is fourth, first, second and third, in other words, the order is indicated in the order of the memory unit MU4, MU1, MU2 and MU3.

The indications of the word selection by the word select signal 64 outputted from the aforementioned word select control circuit 23 is inputted successively to the write/read circuits 19 to 22 of the corresponding memory units MU1 to MU4. The write/read circuits 19 to 22 of the memory units MU1 to MU4 selected by the word select signal 64 output data from the respectively corresponding first to fourth multiplexers 41 to 44 to the data bus 29.

For example, when the way A is specified and the address lower bit 28 is "00", since the word order is first, second, third and fourth, at first, the memory unit MU1 is specified by the word select signal 64.

In the first multiplexer 41 of the memory unit MU1, $b_{01A}$ and $b_{11A}$ which are the bits of the way A of the first byte memory 1 are connected to the first write/read circuit 19, in the second multiplexer 42, $b_{21A}$ and $b_{31A}$ which are the bits of the way A of the second byte memory 2 are connected to the second write/read circuit 20, in the third multiplexer 43, $b_{41A}$ and $b_{51A}$ which are the bits of the way A of the third byte memory 3 are connected to the third write/read circuit 21, and in the fourth multiplexer 44, $b_{61A}$ and $b_{71A}$ which are the bits of the way A of the fourth byte memory 4 are connected to the fourth write/read circuit. 22, respectively.

Thereby, from the write/read circuits 19 to 22 of the memory unit MU1 to the data bus 29, 8 bits of $b_{01A}$ to $b_{71A}$ of the first word of the way A are outputted.

Next, the memory unit MU2 is specified by the word select signal 64.

In the first multiplexer 4i of the memory unit MU2, $b_{02A}$ and $b_{12A}$ which are the bits of the way A of the first byte memory 1 are connected to the first write/read circuit 19, in the second multiplexer 42, $b_{22A}$ and $b_{32A}$ which are the bits of the way A of the second byte memory 2 are connected to the second write/read circuit 20, in the third multiplexer 43, $b_{42A}$ and $b_{52A}$ which are the bits of the way A of the third byte memory 3 are connected to the third write/read circuit 21, and in the fourth multiplexer 44, $b_{62A}$ and $b_{72A}$ which are the bits of the way A of the fourth byte memory 4 are connected to the fourth write/read circuit 22, respectively.

Thereby, from the write/read circuits 19 to 22 of the memory unit MU2 to the data bus 29, 8 bits of $b_{02A}$ to $b_{72A}$ of the second word of the way A are outputted.

In the same way, next, the memory unit MU3 is specified, and from the write/read circuits 19 to 22 to the data bus 29, 8 bits of $b_{03A}$ to $b_{73A}$ of the third word of the way A are outputted, and further next, the memory unit MU4 is specified, and from the write/read circuits 19 to 22 to the data bus 29, 8 bits of $b_{04A}$ to $b_{74A}$ of the fourth word of the way A are outputted successively.

In addition, outputting of the data to the data bus 29 is performed irrespective of the error signal 18, and whether the read out data is valid or invalid is judged outside the memory system in accordance with the error signal 18.

In this way, in the embodiment of the cache memory system shown in FIG. 8, FIG. 9 and FIG. 10, in order to perform continuous reading smoothly, data in each row is read out at the same time from the first to fourth byte memories 1 to 4 in each of the memory units MU1 to MU4, and only each of the hit bits of the data of the way is given to each of the multiplexers 41 to 44 in each of he memory units MU1 to MU4 by the way select signal 63, thereby selection is performed for all the words, and the words are outputted to the data bus 29 in order specified by giving the word select signal 64 to the write/read circuits 19 to 22 in each of the memory units MU1 to MU4. Thereby, in each of the memory units MU1 to MU4, hardware for logical circuits for configuring the four multiplexers 41 to 44 increase, however, each of the first to fourth write/read circuits 19 to 22 can be constructed by logical circuit corresponding to 2 bits, the occupied area becomes smaller at the time of layout on a chip. At the same time, load of the data bus 29 becomes smaller.

When read/write signal 27 indicates writing and no way indicates a hit (read miss), it is necessary to input data from the outside to write it. At this time, to which way data is to be written is decided at a portion not shown. When the way is decided in which data is to be written, the way select signal 63 indicates the fact.

In each of the memory units MU1 to MU4, the respective multiplexers 41 to 44 of the first to fourth words connect the respectively corresponding byte memories 1 to 4 and the write/read circuits 19 to 22 in accordance with the indication by the way select signal 63. In this case, the hit signal 61 is non active, and the respective parity calculation circuits 5 to 8 do not perform parity calculation.

When 4-word data to be written is read in from the outside, the word order is decided by the word select control circuit 23 in accordance with the address lower bit 28, and the memory units MU1 to MU4 are successively specified by the word select signal 64. The respective write/read circuits 19 to 22 in each of the memory units MU1 to MU4 write data on the data bus 29 to the respective byte memories 1 to 4 in accordance with the order indicated by the word select signal 64.

At this time, the respective parity calculation circuits 9 to 12 in each of the memory units MU1 to MU4 temporarily latch the respective bits at the time when 4-word data is written in the byte memories 1 to 4, and perform parity calculation after all of the 4-word data are written, and write the respective results to the respectively corresponding parity calculation circuits 5 to 8.

When the read/write signal 27 indicates writing and there is a hit (write hit), the respective parity calculation circuits 5 to 8 temporarily latch the data outputted from the rows specified by the decoders 25 and 26 of the respective byte memories 1 to 4 without parity calculation. The respective multiplexers 41 to 44 connect the respective byte memories 1 to 4 with the respectively corresponding write/read circuits 19 to 22 only concerning the bits corresponding to the way specified by the way select signal 63. In this state, the respective write/read circuits 19 to 22 write data to the respective byte memories 1 to 4 from the data bus 29 through the respective multiplexers 41 to 44.

For example, when the way A hits and the address lower bit 28 is "00", since the first word is specified, the first to fourth multiplexers 41 to 44 of the .memory units MU1 connect the respective byte memories 1 to 4 with the respectively corresponding write/read circuits 19 to 22 concerning only the bits $b_{01A}$, $b_{11A}$, $b_{21A}$, $b_{31A}$, $b_{41A}$, $b_{51A}$, $b_{61A}$ and $b_{71A}$. In this state, the respective write/read circuits 19 to 22 of the memory unit MU1 write the data on the data bus 29 to the aforementioned bit positions in the specified rows of the respective byte memories 1 to 4.

At this time, the respective parity calculation circuits 9 to 12 of the memory unit MU1 input the data written through the respective multiplexers 41 to 44 so as to rewrite only the same bit positions as those of the data latched before. And the respective parity memories 9 to 12 calculate parities with the newly rewritten data and write the results to the specified rows of the respective parity memories 9 to 12.

As aforementioned, according to the memory system and cache memory system of the invention, since the bit arrangement is configured so that the target of the parity calculation has the same bits as those of the different word, or the same bits as those of the same word of the different way, the limitation of the bit arrangement which is the target of the parity calculation is eased to improve the flexibility of the memory configuration, and the write/read circuit on a chip is reduced as well as reduce the electric power consumption.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalents of such meets and bounds thereof are therefore intended to be embraced by the claims.

What is claimed is:

1. A cache memory system of plurality-way set associative type, comprising:

data storing means for storing data in plural-way unit including a plurality of ways, the data being the one in which one word is composed of a predetermined number of bits and one way is composed of a predetermined number of words, and from which data is read out;

parity storing means for storing a plurality of parity bits corresponding to data of plural-bit unit;

writing/reading means for writing data from data bus to a plurality of ways of said data storing means, and for reading simultaneously a predetermined number of data among data of said plurality of ways from said data storing means to said data bus;

way selecting means for selecting way for which data is to be read or written by said writing/reading means;

word selecting means for selecting word data to be read or written by said writing/reading means to the way selected by said way selecting means; and parity calculating means for calculating the parity of the data of a plural-bit unit written in said data storing means and writing the parity to said parity storing means, and for calculating the parity of the data of a plural-bit unit read out from said data storing means for comparing with a corresponding parity stored in said parity storing means;

wherein said data storing means is configured so that the data of plural-bit unit for which parity is calculated by said parity calculating means occupy respectively identical bit positions as those of the word data in a corresponding word in the plurality of ways, and further comprising connecting means for connecting selectively to said data bus the bit positions of the word data selected by the word selecting means of the way selected by the way selecting means.

* * * * *